Oct. 16, 1956     O. A. HARTZELL     2,767,292
POWER CIRCUIT FOR ELECTRIC INDUCTION FURNACES
Filed Dec. 17, 1953
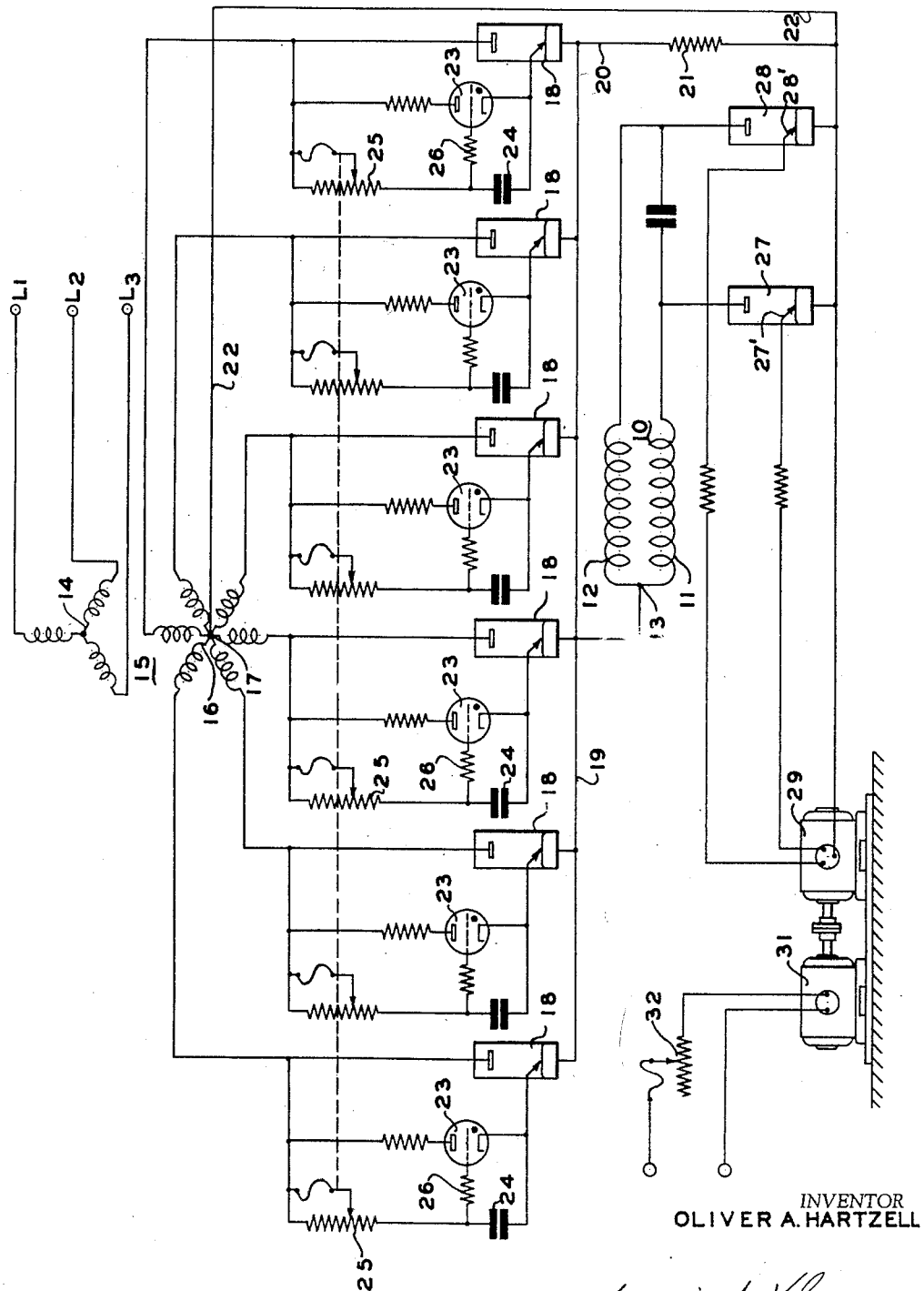
INVENTOR
OLIVER A. HARTZELL
BY *Francis J. Klemfay*
ATTORNEY United States Patent Office 2,767,292
Patented Oct. 16, 1956

2,767,292

POWER CIRCUIT FOR ELECTRIC INDUCTION FURNACES

Oliver A. Hartzell, Youngstown, Ohio, assignor to Lombard Corporation, Youngstown, Ohio, a corporation of Ohio Application December 17, 1953, Serial No. 398,740

10 Claims. (Cl. 219—10.75)

The present invention relates to systems for heating objects through electric induction, and more particularly to an induction heating system incorporating an improved and novel power supply circuit whereby the heating process may be carried out in an efficient and expeditious manner.

As a primary object the present invention seeks to provide a novel induction heating system, including a power supply network, which is of a simple nature yet capable of variation and adjustment in all important respects so that the system as a whole is inherently versatile and so the same may be operated under conditions of high efficiency at all times.

In the heating of objects by electric induction processes the object to be heated is positioned in close proximity to an electric conductor, more commonly referred to as an induction coil, through which is passed an alternating current of relatively high intensity. The current passing through the inductor coil sets up a magnetic flux in the area immediately surrounding the conductors of the coil, which flux is of an intensity which varies both with respect to orientation and magnitude with the current in the conductor. By positioning the object to be heated in sufficiently close proximity to the coil this magnetic flux may be caused to penetrate the object, creating therein electric currents, known as eddy currents, which are a function of both the intensity of the flux and the rate of change of intensity thereof. And heating of the object is effected by resistance losses within the object as may be readily understood.

It has been determined heretofore, in the practice of electric induction heating processes, that control of the heating operation may be advantageously effected through two mediums, i. e. regulation of the intensity of the current passing through the inductor coil, and regulation of the frequency of the alternations. Each of these factors has a different effect upon the heating operation so that in order to most expeditiously accomplish the desired result a favorable balance between the two must be obtained. For example, by regulating the rate or intensity of current flow through the inductor coil the time required to complete the heating operation may be increased or decreased. While by regulating the frequency at which the power current reverses polarity, or alternates, the depth of penetration or depth of heating may be varied. Thus, in heating large objects it may be desirable to reduce the frequency of alternation so that a greater depth of penetration is obtained, while at the same time increasing the intensity of current flow so that the operation is completed in a practical time. Or, in some instances, it may be desirable, in heating large objects, to substantially increase the frequency of alternation so that only outer portions of the object are heated, as for example where special heat treatment effects are desired.

Accordingly, it is a more specific object of this invention to provide an induction heating system, including a novel power supply, wherein the power supply is adapted for ready adjustment with respect to current intensity and frequency of alternation, the system being thereby adapted for carrying out diverse operations at maximum efficiency.

Another object of the invention is the provision of an induction heating system of the type and having the characteristics set forth above which may be operated from a commercial source of three-phase power, such commercial power being commonly provided in most places of manufacture, and being generally most efficient for commercial use.

More specifically, it is an object of the present invention to provide a novel power circuit, particularly for induction heating systems, which is operative to effect the conversion of commercial three phase power so that power may be supplied to the inductor coil of a conventional induction heating device at frequencies other than commercial frequencies, and at various intensities.

A further object of the invention resides in the provision of a power supply circuit as above characterized wherein both current intensity and frequency of alternation of the output power may be regulated wholly independently.

Yet another object of the invention is the provision of a power supply circuit having the above enumerated characteristics which is of a generally simplex nature and which is economical to manufacture and maintain.

The above and other objects and advantages of the invention will become apparent upon full consideration of the following detailed specification and accompanying drawing wherein is shown a preferred embodiment of the invention.

The sole figure of the drawing is a schematic representation of an induction heating system incorporating the novel power supply circuit of my invention.

Referring now to the drawing, the reference numeral 10 designates generally the heating chamber of an induction heating furnace which, in accordance with the teachings of the invention, comprises a pair of heating coils 11 and 12 having a common electrical connection at 13, forming, in effect, a single center-tapped inductor coil. In accordance with conventional practice, objects to be heated are positioned within the chamber, in close proximity to the coils 11 and 12, whereby, upon energization of the latter, the object, not shown, is heated in the manner desired.

To supply energizing current to the coils 11 and 12 there is a conventional three-phase power source, represented by conductors L1, L2 and L3, which is connected to the three-phase primary winding 14 of a power transformer 15.

In the illustrated embodiment of the invention there is provided a secondary winding 16 for the transformer 15 which comprises six star-connected coils, having a common terminal 17. Each of the outer terminals of the secondary coils connects the anode element of an arc discharge type rectifier device 18 which may be of a conventional type.

Connecting the cathode elements of the discharge devices 18 is a common conductor 19 which is in turn connected to the common terminal 17 of the transformer through conductor 20, dummy load resistor 21 and conductor 22. The arrangement is such that upon energization of the transformer 15 the coils of the secondary 16 are periodically energized in such manner that a six-phase output is obtained. And each of the six discharge devices 18 is energized in accordance with the instantaneous potential existing in the coil to which it is individually connected. Thus, it will be apparent that one or more of the discharge devices 18 will at all times be energized with a positive potential at its anode and thereby conditioned for conduction.

In accordance with the teachings of the invention the discharge devices 18 are of a type which require external "firing." That is, mere application of anode-cathode potential of the proper magnitude and polarity will condition the discharge devices 18 for conduction, but will not cause the same to conduct in the absence of further energization. Thus, I have provided in connection with each discharge device 18, in parallel circuit relation therewith, an initiating device 23, which may be a gaseous discharge device, for example. Conventionally, the cathode element of each of the initiating devices 23 is connected to the firing electrode 24 of the discharge device 18 which is associated therewith, while the anode element is connected to the anode of the associated discharge device 18. The arrangement is such that upon application of anode-cathode potential of proper polarity to any of the discharge devices 18, a like anode-cathode potential is applied to the associated initiating device 23 so that conduction may be initiated in the principal discharge device 18.

As will be readily apparent the plurality of discharge devices 18 permit only a uni-directional flow of current through the dummy load resistor 21. And inasmuch as there is a relatively large number of such discharge devices 18, one or more of which will be conducting substantially at all times during operation, such uni-directional flow of current will remain relatively smooth and continuous. Thus, there is provided a source of uni-directional potential between conductors 19 and 22 which I utilize in a manner hereafter to be described to energize the coils 11 and 12 for heating an object positioned in proximity thereto.

It is generally desirable, and it is further in accordance with the objects of this invention that the magnitude of the uni-directional potential created at the conductors 19 and 21 be capable of regulation. And to this end I have provided control grid circuits for the initiating devices 23 which comprise series connected capacitor and potentiometer components 24 and 25, respectively, which are connected, as a unit, in parallel relation with the anode and cathode of each initiating device 23. The control grid of each of the initiating devices 23 is connected through a conventional current limiting resistor 26 to a terminal of each of the capacitors 24 and potentiometers 25 associated with the device 23 whereby upon application of anode-cathode potential to the device 23 a control potential will be applied to the device 23 which may be in predetermined out-of-phase relation with the anode-cathode potential. Thus, it will be apparent that by suitable regulation of the potentiometers 25 the discharge devices 18 may be prevented from firing for a predetermined time period following the application of anode-cathode potential thereto. And I may utilize this means to regulate the magnitude of the uni-directional potential appearing between conductors 19 and 22 as will be readily understood.

It is desirable, of course, that all of the several discharge devices 18 be conditioned for conduction over similar portions of the respective anode-cathode potential waves applied thereto so that balanced circuit conditions may be maintained. Accordingly, in the illustrated embodiment of the invention, the plurality of control potentiometers 25 are mechanically interconnected or ganged so that equal and simultaneous adjustment of the entire bank of potentiometers is assured.

In accordance with the teachings of the invention the common terminal 13 of the inductor coils 11 and 12 is connected to the conductor 19, representing the positive terminal as between supply conductors 19 and 22, while the opposite terminals of the coils 11 and 12 are independently connected to separate rectifier devices 27 and 28, which are preferably of an electronic arc discharge type similar to discharge devices 18. In accordance with usual practice the discharge devices 27 and 28 are provided with igniter electrodes 27' and 28' by means of which the discharge devices may be caused to conduct, conditioned, of course, upon the prior application of proper anode-cathode potential thereto.

As is apparent in the drawing the cathode elements of both discharge devices 27 and 28 are connected in common to the conductor 22. And it will thus be understood that during normal operation of the system anode-cathode potential will at all times be applied to the discharge devices 27 and 28 by supply conductors 19 and 22. To render the last mentioned discharge devices conducting, therefore, to energize the inductor coils 11 and 12, it is merely necessary to energize the igniter electrodes 27' and 28'.

It is contemplated by the present invention that the discharge devices 27 and 28 will be caused to fire or conduct alternately so that energizing current flows first through one, then the other of the inductor coils 11 and 12, the arrangement being such that although current at all times flows uni-directionally through the coils 11 and 12 the effect of such alternate energization of the separate coils upon an object to be heated is substantially as where an alternating current is passed through a single coil, as is the conventional practice. Of course, in this respect it is necessary that the coils 11 and 12 be so relatively disposed that opposite inductive effects are produced.

To effect alternate energization of the discharge devices 27 and 28, and coils 11 and 12, in the manner desired I have connected the respective igniter electrodes 27' and 28' to opposite terminals of a suitable alternating current generating device 29, which is preferably of a single phase type. Thus, as the generating device 29 is operated first one and then the other of the igniter electrodes 27' and 28' is energized.

It will be observed, of course, that since energizing anode-cathode potential is constantly supplied to the discharge devices 27 and 28 through conductors 19 and 22, these same discharge devices, once rendered conducting, will tend to continue conducting indefinitely. Therefore I provide a capacitor 30 which connects the anodes of the discharge devices 27 and 28, as in a conventional "flip-flop" circuit, whereby upon one of the discharge devices being rendered conductive the other is extinguished by the temporary removal of anode-cathode potential therefrom. It is thus assured that only one of the coils 11 or 12 will be energized at any one instant.

As heretofore stated, it is in accordance with the objects of the invention that the frequency of alternation of the energizing current supplied to the coils 11 and 12 be readily variable to suit the particular requirements of the operation undertaken. Accordingly, I have provided suitable means for driving the alternator 29 at variable speeds, such means in the illustrated embodiment of the invention comprising a direct current motor 31 which is coupled to the alternator 29 and which is provided with suitable control means, such as a variable line resistor 32 for varying the speed of rotation of the motor. Thus by mere manipulation of the variable resistor 32 the frequency of alternation may be varied over a wide range, up to a maximum which is a function of the maximum speed of the motor 31.

It should now be apparent that I have accomplished the objects initially set forth. I have provided a novel and highly simplified power system for use in combination with induction heating furnaces which is characterized not only by its simplicity, but by the ease and accuracy with which the same may be regulated to most effectively accomplish the operation undertaken. The invention teaches a novel induction heating system which utilizes conventional commercial three-phase power input, while providing a single-phase power output which is readily variable both as to frequency and as to intensity, all of which features are highly desirable for the purpose intended.

My invention is perhaps most significantly characterized by its underlying simplicity, particularly with regard to the use of a pair of inductor coils connected in parallel for alternate energization by means of the variable speed alternator 29. While the arrangement is highly simplified it is at once apparent that the same affords an extremely wide range of frequencies at which the induction heating system may be operated, adjustment of such frequency being effected by mere manipulation of the variable resistor 32.

Likewise, the power level or current intensity of the system may be as readily varied by mere manipulation of the multiple resistors 25. Thus, it may be observed that complete control of the system may be effected through the manipulation of but two control members. And skilled operators are unnecessary as will be readily apparent.

It should be understood, however, that the specific embodiment herein illustrated and described in detail is intended to be representative only, and reference should therefore be had to the following appended claims in determining the full scope of the invention.

I claim:

1. In an induction heating system of the type comprising a multi-phase source of electric power and an induction heating device; the improvement comprising a pair of induction coils for said heating device, said coils having a common first terminal, arc discharge devices connecting the second terminals of said coils, said discharge devices being connected in parallel relation and having a common terminal, separate igniter elements for said discharge devices, means to energize said separate elements in alternate relation comprising an alternator and means to operate said alternator at variable speeds, capacitor means connecting the anodes of said discharge devices, and means to maintain a uni-directional potential between said first and second mentioned common terminals comprising the secondary winding of a multi-phase transformer and separate arc discharge devices connecting the terminals of said secondary winding and one of said common terminals.

2. Apparatus according to claim 1 further characterized in that said multi-phase transformer comprises a three-phase primary winding and a six-phase secondary winding, said separate arc discharge devices being at least six in number and having like electrodes connecting the terminals of said secondary winding and like electrodes connecting said one of said common terminals, and means to condition said separate arc discharge devices for conduction independently of the anode-cathode potential applied thereto comprising variable means.

3. Apparatus according to claim 1 further characterized in that said means to operate said alternator at variable speeds comprises a direct current motor, a source of direct current power therefor, and means to vary said direct current power whereby to vary the speed of rotation of said direct current motor.

4. Apparatus according to claim 1 further characterized in that said multi-phase transformer includes a plurality of secondary terminals, said separate arc discharge devices being connected to individual ones of said secondary terminals, and means to vary the conduction in said separate arc discharge devices including a plurality of potentiometers having mechanical interconnection.

5. In an induction heating system of the type comprising a multi-phase source of electric power and an induction heating device; the improvement comprising a pair of induction coils for said heating device, said coils having a common first terminal and separate second terminals, arc discharge devices connecting the second terminals of said coils, said discharge devices being connected in parallel relation and having a common terminal, means associated with said multi-phase source and said common terminals for supplying uni-directional energy of variable intensity to said common terminals, means to energize said discharge devices in variable frequency alternating relation, and a capacitor connecting the anodes of said discharge devices for extinguishing one of said discharge devices upon energization of the other.

6. Apparatus according to claim 5 further characterized by said means to energize said discharge devices in alternate relation comprising igniter electrodes for said discharge devices, a source of alternating potential for energizing said igniter electrodes, and means to vary the frequency of said source of alternating potential.

7. Apparatus according to claim 6 further characterized by said source of alternating potential comprising a single-phase alternator, a direct current motor mechanically coupled with said alternator, and means to vary the speed of rotation of said direct current motor.

8. Apparatus according to claim 6 further characterized by said source of alternating potential comprising a single-phase alternator, and means to vary the output frequency of said alternator.

9. In an induction heating system of the type comprising a three-phase source of electric power and an induction heating device; the improvement comprising a pair of induction coils for said heating device, said coils having a common first terminal and separate second terminals; separate means connecting said second terminals and having a common terminal for controlling the flow of current through said coils, said separate means including means to effect the variable frequency alternate flow of current through first one coil then the other; and a source of uni-directional power connecting said terminals, said source comprising a multi-phase transformer having a three-phase primary and a six-phase secondary, separate discharge devices connecting the terminals of said secondary and one of said common terminals, and means including igniter electrodes for said discharge devices for controlling the flow of current therethrough independently of the anode-cathode potential applied thereto.

10. Apparatus according to claim 9 further characterized by said last mentioned means further including gaseous discharge devices and firing circuits therefor including phase-shifting means.

References Cited in the file of this patent

UNITED STATES PATENTS

| | | |
|---|---|---|
| 1,864,364 | Mittag | June 21, 1932 |
| 2,025,911 | Stansbury | Dec. 31, 1935 |
| 2,088,490 | Slepian | July 27, 1937 |
| 2,259,294 | Cox et al. | Oct. 14, 1941 |
| 2,372,104 | Myers | Mar. 20, 1945 |
| 2,446,202 | Vang | Aug. 3, 1948 |
| 2,456,800 | Taylor et al. | Dec. 21, 1948 |
| 2,473,915 | Slepian et al. | June 21, 1949 |
| 2,548,474 | Hansen | Apr. 10, 1951 |